US008486328B2

(12) United States Patent
Ohmori et al.

(10) Patent No.: US 8,486,328 B2
(45) Date of Patent: Jul. 16, 2013

(54) BONDING AGENT COMPRISING SPHERICAL SINTERED METAL OXIDE POWDER

(75) Inventors: Makoto Ohmori, Nagoya (JP);
Toshiyuki Nakamura, Nagoya (JP);
Takashi Ryu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 377 days.

(21) Appl. No.: 12/837,708

(22) Filed: Jul. 16, 2010

(65) Prior Publication Data

US 2011/0052916 A1    Mar. 3, 2011

(30) Foreign Application Priority Data

Aug. 26, 2009  (JP) ................................. 2009-195071
Oct. 21, 2009  (JP) ................................. 2009-242621
May 13, 2010  (JP) ................................. 2010-110707

(51) Int. Cl.
| | |
|---|---|
| B22F 3/10 | (2006.01) |
| B22F 7/08 | (2006.01) |
| H01M 2/16 | (2006.01) |
| H01M 2/18 | (2006.01) |

(52) U.S. Cl.
USPC ............... 419/23; 419/8; 419/66; 429/479; 429/484; 429/485; 429/488; 429/489; 429/509; 429/510; 429/533

(58) Field of Classification Search
USPC ............... 429/479, 484, 485, 488, 489, 509, 429/510, 533; 419/19, 22, 8, 23, 66
See application file for complete search history.

(56) References Cited

U.S. PATENT DOCUMENTS

| 6,228,522 B1 * | 5/2001 | Batawi et al. ................. 429/468 |
| 2002/0122971 A1 * | 9/2002 | Ghosh et al. .................... 429/40 |
| 2007/0111069 A1 * | 5/2007 | Rehg et al. ....................... 429/32 |
| 2009/0011323 A1 * | 1/2009 | Guan et al. ....................... 429/41 |
| 2010/0193104 A1 * | 8/2010 | Ryu et al. ...................... 156/62.2 |
| 2011/0111324 A1 * | 5/2011 | Ohmori et al. ................. 429/495 |

FOREIGN PATENT DOCUMENTS

| EP | 2 223 897 A1 | 9/2010 |
| EP | 2 224 516 A1 | 9/2010 |
| JP | 2005-339904 A1 | 12/2005 |

OTHER PUBLICATIONS

Zhang et al., Solid oxide fuel cell composite cathodes prepared by infiltration of copper manganese spinel into porous yttria stabilized zirconia, J. of Mater. Chem., 2008, 18, 43-41-4346, available online Aug. 5, 2008.*

* cited by examiner

*Primary Examiner* — Hoa (Holly) Le
(74) *Attorney, Agent, or Firm* — Burr & Brown

(57) ABSTRACT

Powders of respective metal elements (Mn,Co) constituting a transition metal oxide ($MnCo_2O_4$) having a spinel type crystal structure are used as a starting material. A paste containing the mixture of the powders is interposed between an air electrode and an interconnector, and with this state, a sintering is performed, whereby a bonding agent according to the present invention can be obtained. This bonding agent has a "co-continuous structure". In the "co-continuous structure", a thickness of an arm portion that links many base portions to one another is 0.3 to 2.5 μm. The bonding agent includes a spherical particle in which plural crystal faces are exposed to the surface, the particle having a side with a length of 1 μm or more, among the plural sides constituting the outline of the crystal face. The diameter of the particle is 5 to 80 μm.

10 Claims, 12 Drawing Sheets

BONDING AGENT COMPRISING SPHERICAL SINTERED METAL OXIDE POWDER

BACKGROUND OF THE INVENTION

1. Field of the Invention

The present invention relates to a bonding agent for bonding two conductive connection members.

2. Description of the Related Art

A cell (single cell) of a solid oxide fuel cell (SOFC) includes a solid electrolyte, a fuel electrode formed integral with the solid electrolyte, and an air electrode formed integral with the solid electrolyte. A fuel gas (hydrogen gas, etc.) is supplied to the fuel electrode of the SOFC cell and a gas (air, etc.) containing oxygen is supplied to the air electrode of the SOFC cell, whereby a chemical reaction represented by Formulas (1) and (2) described below is generated. Thus, a potential difference is produced between the fuel electrode and the air electrode. This potential difference is based upon an oxygen conductivity of the solid electrolyte.

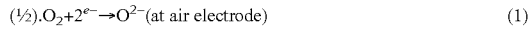

$$(\tfrac{1}{2}) \cdot O_2 + 2e^- \rightarrow O^{2-} \text{(at air electrode)} \quad (1)$$

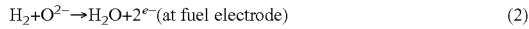

$$H_2 + O^{2-} \rightarrow H_2O + 2e^- \text{(at fuel electrode)} \quad (2)$$

In the SOFC, a conductive connection member (hereinafter referred to as interconnector) for collecting electric current is bonded and fixed to each of the fuel electrode and the air electrode with a bonding agent. Power based upon the potential difference is taken out to the outside through the respective interconnectors. Attention is particularly focused on the bonding between the air electrode and the interconnector below.

An expensive Pt material has conventionally been used as the bonding agent to bond the air electrode and the interconnector so as to electrically connect the air electrode and the interconnector. A silver material from a metal and a conductive ceramic material from a ceramic are considered as a substitute material for the Pt material in order to reduce cost. For example, Japanese Unexamined Patent Application No. 2005-339904 discloses La—Sr—Co—Fe perovskite complex material as a conductive ceramic material for fixedly bonding the air electrode and the interconnector.

SUMMARY OF THE INVENTION

The present inventor has focused an attention on a transition metal oxide (e.g., $MnCo_2O_4$, $CuMn_2O_4$) having a spinel type crystal structure as the conductive ceramic material that bonds the air electrode and the interconnector so as to electrically connect the air electrode and the interconnector. The conductive spinel type oxide is slightly poor in conductivity but excellent in sintering performance compared to the above-mentioned perovskite oxide.

When the spinel type material is used as the bonding agent, a paste is sintered with a paste, which is a precursor of the bonding agent, being interposed between the bonding portion of the air electrode and the bonding portion of the interconnector. Thus, the air electrode and the interconnector are bonded and electrically connected by the bonding agent that is a sintered body. Generally, a ferrite SUS material is used as the material of the interconnector at the air electrode side. The ferrite SUS material is generally used in a state in which a uniform chromia ($Cr_2O_3$) film is formed on the surface with a preliminary oxidation process.

The chromia ($Cr_2O_3$) is easy to be formed as the temperature is high. Therefore, when an excessive high-temperature heat treatment (a heat treatment applied to a bonding agent made of a glass) is performed in an assembling process afterward, the chromia ($Cr_2O_3$) is excessively formed at the interface between the interconnector and the bonding agent. The electrical resistance of the chromia ($Cr_2O_3$) is relatively great. Therefore, when the chromia ($Cr_2O_3$) is excessively formed on the interface, the electric resistance as the whole SOFC increases, whereby the output of the whole SOFC is easy to reduce. From the above, it is necessary to sinter the paste with a relatively low temperature in order to prevent the excessive formation of the chromia ($Cr_2O_3$) on the interface between the interconnector and the bonding agent when the paste, which is the precursor of the bonding agent, is sintered.

In case where the paste, which is the precursor of the bonding agent, is sintered with the relatively low temperature as described above, the following two points are required as the bonding agent that is a sintered body.

1. The bonding agent is fully dense, and gives high conductivity (gives small electric resistance)
2. The bonding agent gives high bonding strength.

The present inventor has found the bonding agent that has a spinel type material and that can well satisfy two requirements described above, even when the paste, which is the precursor, is sintered with the relatively low temperature.

Specifically, the bonding agent according to the present invention bonds a first conductive connection member and a second conductive connection member, which is different from the first conductive connection member, to each other, and electrically connects the first and the second conductive connection members to each other, wherein the bonding agent contains a transition metal oxide having a spinel type crystal structure. Examples of the first conductive connection member include the air electrode in "the cell of a solid oxide fuel cell including a solid electrolyte, a fuel electrode that is integrally arranged with the solid electrolyte and that is brought into contact with a fuel gas to allow the fuel gas to react, and an air electrode that is integrally arranged with the solid electrolyte and that is brought into contact with a gas containing oxygen to allow the gas containing oxygen to react", a conductive portion that is fixed to the fuel electrode of the cell, that is electrically connected to the fuel electrode, and that is made of lanthanum chromite represented by a chemical formula $La_{1-x}A_xCr_{1-y+z}B_yO_3$ (A: at least one type of element selected from Ca, Sr, and Ba, B: at least one type of element selected from Co, Ni, and Al, range of x: 0.05 to 0.2, range of y: 0.02 to 0.22, range of z: 0.02 to 0.05), and a conductive portion that is fixed to the fuel electrode, that is electrically connected to the fuel electrode, and that is made of a titanium oxide represented by a chemical formula $(A_{1-x}B_x)_{1-z}(Ti_{1-y}D_y)O_3$ (A: at least one type of element selected from alkaline-earth element, B: at least one type of element selected from Sc, Y, and lanthanoid element, D: at least one type of element selected from fourth-period, fifth-period, and sixth-period transition metals, Al, Si, Zn, Ga, Ge, Sn, Sb, Pb, and Bi, range of x: 0 to 0.5, range of y: 0 to 0.5, range of z: −0.05 to 0.05).

The bonding agent according to the present invention is characterized by containing (one or more) particles, each of which has a co-continuous structure, and is a spherical particle having plural crystal surfaces exposed to the front surface and having a side with a length of 1 μm or more of plural sides constituting the outline of the crystal surface. Here, the "co-continuous structure" is not a point-contact structure in which ceramic powders are collected and the contact points of the adjacent particles are connected with the sintering, but the structure in which many base portions from which two or more (thick) arm portions extend are three-dimensionally (stereoscopically) arranged, and the arm portions extending from the different base portions are three-dimensionally (stereoscopically) connected to each other so as to allow many base portions to be three-dimensionally (stereoscopically) connected to one another through the arm portions. In the co-continuous structure, gaps (pores) that are three-dimensionally (stereoscopically) continuous (in a network form) are formed at the region except for the base portions and the arm portions. The co-continuous structure can be restated as a three-dimensional network structure. When plural particles described above are contained in the bonding agent, it is preferable that each particle has a side with a length of 1 µm or more among the plural sides constituting the outline of the crystal face.

In the co-continuous structure, the thickness of the arm portion that links many base portions to one another is preferably 0.3 to 2.5 µm. The diameter of the particle is preferably 5 to 80 µm. The transition metal oxide preferably contains at least one of $MnCo_2O_4$ and $CuMn_2O_4$.

The bonding agent having the co-continuous structure made of the spinel type material can be formed by sintering as a paste containing metal powders of the respective metal elements constituting the transition metal oxide. The bonding agent is interposed between the first and second conductive connection members. When the bonding agent made of the spinel type material is formed by oxidizing the powders of the respective metal elements serving as the starting material upon the sintering, the bonding agent that is sufficiently densified, has sufficiently high conductivity (small electric resistance), and has sufficiently great bonding strength can be obtained, even if the sintering temperature is relatively low (e.g., 700 to 900° C.).

The bonding agent according to the present invention may include a noble metal in addition to the transition metal oxide. Examples of the noble metal include Pt, and Ag. The electric resistance of the bonding agent can be reduced by containing the noble metal into the bonding agent.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT (Structure)

Figure 1:
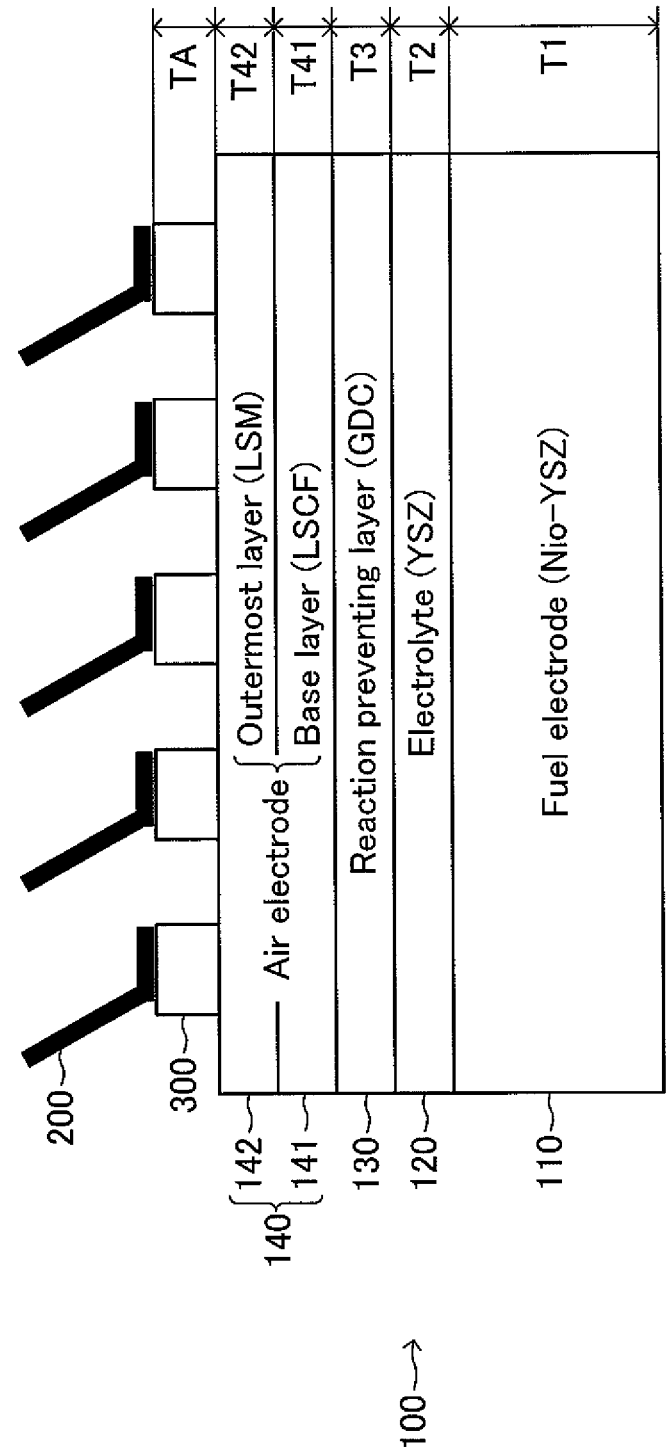
FIG. 1 is a schematic diagram illustrating a configuration in which an air electrode and an interconnector of an SOFC cell are bonded by a bonding agent according to the present embodiment.

FIG. 1 illustrates one example of a structure (bonding member) having an air electrode of an SOFC cell and an interconnector bonded to each other by a bonding agent according to the embodiment of the present invention. In the bonding member illustrated in FIG. 1, an SOFC cell 100 is a stacked body including a fuel electrode 110, an electrolyte 120 stacked on the fuel electrode 110, a reaction preventing layer 130 stacked on the electrolyte 120, and an air electrode 140 stacked on the reaction preventing layer 130. The shape of the cell 100 viewed from the top is, for example, a square having a side of 1 to 30 cm, a rectangle having a long side of 5 to 30 cm and a short side of 3 to 15 cm, or a circle having a diameter of 1 to 30 cm. The thickness of the cell 100 is 0.1 to 3 mm.

The fuel electrode 110 (anode electrode) is, for example, a porous sintered body having a thin plate-like shape composed of nickel oxide NiO and yttria stabilized zirconia YSZ. The thickness T of the fuel electrode 110 is 0.1 to 3 mm. The thickness of the fuel electrode 110 is the greatest among the respective components of the cell 100, so that the fuel electrode 110 serves as a support substrate of the cell 100.

The electrolyte 120 is a dense sintered body having a thin plate-like shape composed of YSZ. The thickness T2 of the electrolyte 120 is 3 to 30 µm.

The reaction preventing layer 130 is a dense sintered body having a thin plate-like shape composed of celia. Specific examples of celia include GDC (gadolinium-doped celia), SDC (samarium-doped celia), etc. The thickness T3 of the reaction preventing layer 130 is 3 to 20 µm. The reaction preventing layer 130 is interposed between the electrolyte 120 and the air electrode layer 140 in order to prevent the occurrence of the phenomenon in which an electric resistance between the electrolyte 120 and the air electrode 140 increases through the reaction between the YSZ in the electrolyte 120 and the strontium in the air electrode 140 during the fabrication of the cell or in the cell 100, which is currently operated, of the SOFC.

The air electrode 140 (cathode electrode) includes two layers, which are a base layer 141 and an outermost layer 142. The base layer 141 is a porous sintered body having a thin plate-like shape and made of lanthanum strontium cobalt ferrite LSCF ($La_{0.6}Sr_{0.4}Co_{0.2}Fe_{0.8}O_3$). The outermost layer 142 is a porous sintered body having a thin plate-like shape and having a perovskite structure containing manganese. The outermost layer 142 is made of, for example, lanthanum strontium manganite LSM ($La_{0.6}Sr_{0.2}MnO_3$), lanthanum manganite LM ($LaMnO_3$), etc. At the air electrode 140, the thickness T1 of the base layer 141 is 5 to 50 μm, and the thickness T2 of the outermost layer 142 is 5 to 50 μm.

The reason why the air electrode 140 has two-layer structure is based upon the fact that the reaction speed of the LSCF of the chemical reaction represented by the formula (1) is higher than that of the LSM because the activity of the LSCF is higher than that of the LSM, and upon the fact that the bonding strength of the LSM to the bonding agent containing the spinel type material is greater than that of the LSCF. Specifically, the air electrode layer 140 includes two layers in order to increase the reaction speed for the chemical reaction represented by the formula (1) in the air electrode 140 and to increase the bonding strength between the air electrode and the bonding agent.

In the present embodiment, the base layer 141 includes only one layer that is the LSCF layer. However, the base layer 141 may include plural layers. For example, the base layer 141 may include two layers, which are the LSCF layer (air electrode) stacked on the reaction preventing layer 130 and a lanthanum strontium cobalt LSC ($La_{0.8}Sr_{0.2}CoO_3$) layer (current-collecting layer) stacked on the LSCF layer (i.e., interposed between the LSCF layer and the outermost layer (LSM layer) 142). Further, an LSCF layer (thermal stress buffer layer) may be interposed between the LSC layer and the outermost layer (LSM layer) 142 (i.e., the base layer 141 may include three layers). Instead of the LSCF, LSC, lanthanum strontium ferrite LSF ($La_{0.8}Sr_{0.2}FeO_3$), lanthanum nickel ferrite LNF ($LaNi_{0.6}Fe_{0.4}O_3$), etc. may be used as the material of the air electrode.

The interconnector 200 is a conductive connection member made of a ferrite SUS material. The bonding portion of each of the plural interconnectors 200, each having the same shape, and the bonding portion of the outermost layer (i.e., LSM layer) of the air electrode 140 in the cell 100 is bonded and electrically connected by the bonding agent 300.

The bonding agent 300 is a sintered body made of a transition metal oxide having a spinel type crystal structure. For example, the bonding agent 300 is made of $MnCo_2O_4$, $CuMn_2O_4$, etc. The thickness TA of the layer of the bonding agent 300 is 20 to 500 μm. A noble metal such as Pt or Ag may be contained in the bonding agent 300. The electric resistance of the bonding agent can be reduced by containing the noble metal into the bonding agent 300.

(Fabrication Process)

Next, one example of a method of fabricating the bonding member illustrated in FIG. 1 will be described below. Firstly, one example of fabricating the cell 100 will be described.

The fuel electrode layer 110 is formed as described below. Specifically, 60 parts by weight of NiO powder, and 40 parts by weight of YSZ powder are mixed, and polyvinyl alcohol (PVA) is added to the mixture as a binder, whereby slurry is prepared. This slurry is dried and granulated with a spray dryer to obtain powders for the fuel electrode. The powders are molded with a die press molding, and then, the resultant is sintered in an electric furnace at 1400° C. for 3 hours in air, whereby the fuel electrode 110 is fabricated.

The electrolyte 120 is formed on the fuel electrode 110 as described below. Specifically, water and binder are added into YSZ powder, and the resultant mixture is mixed with a ball mill for 24 hours to prepare slurry. This slurry is applied on the fuel electrode 110, dried, and then, co-sintered in an electric furnace at 1400° C. for 2 hours in air, whereby the electrolyte 120 is formed on the fuel electrode 110. When the film, which is to become the electrolyte 120 afterward, is formed on the fuel electrode 110, a tape staking method, printing method, etc. may be used.

The reaction preventing layer 130 is formed on the electrolyte 120 as described below. Specifically, water and binder are added into GDC powder, and the resultant mixture is mixed with a ball mill for 24 hours to prepare slurry. The slurry is applied on the electrolyte 120, dried, and then, sintered in an electric furnace at 1350° C. for 1 hour in air, whereby the reaction preventing layer 130 is formed on the electrolyte 120. When a film, which is to become the reaction preventing layer 130 afterward, is formed on the electrolyte 120, a tape staking method, printing method, etc. may be used. The reaction preventing layer 130 may be formed with co-sintering.

The base layer 141 of the air electrode 140 is formed on the reaction preventing layer 130 as described below. Specifically, water and binder are added into LSCF powder, and the resultant mixture is mixed with a ball mill for 24 hours to prepare slurry. The slurry is applied on the reaction preventing layer 130, dried, and then, sintered in an electric furnace at 1000° C. for 1 hour in air, whereby the air electrode 140 is formed on the reaction preventing layer 130.

The outermost layer 142 is formed on the base layer 141 as described below. Specifically, water and binder are added into LSM powder, and the resultant mixture is mixed with a ball mill for 24 hours to prepare slurry. The slurry is applied on the base layer 141, dried, and then, sintered in an electric furnace at 1000° C. for 1 hour in air, whereby the outermost layer 142 is formed on the base layer 141. One example of the method of fabricating the cell 100 has been described above.

The interconnector 200 is formed by processing a ferrite SUS material into a predetermined shape by a machining process. Plural interconnectors 200, each having the same shape, are prepared.

The outermost layer 142 and the interconnector 200 are bonded by the bonding agent 300 as described below. The case in which the spinel type material is $MnCo_2O_4$ will be described as one example. Firstly, metal powder of manganese Mn and metal powder of cobalt Co are weighed and mixed with a molar ratio of 1:2. The diameter of the metal powder is 0.5 to 5 μm, and the average diameter is 2 μm. A noble metal powder such as Pt or Ag may be added thereto. Ethyl cellulose serving as binder and terpineol serving as a solvent are added to the mixture, according to need, and the resultant mixture is mixed in a mortar to form a paste used for bonding. The bonding paste is applied onto the bonding portion between the surface of the outermost layer 142 (i.e., LSM layer) of the air electrode 140 in the cell 100 and the interconnector 200, whereby the outermost layer 142 and the interconnector 200 are bonded to each other. Thereafter, this paste is dried at 100° C. for 1 hour, and then, sintered in air for 1 hour at a relatively low temperature of 850° C., whereby the bonding agent 300, which is a sintered body, is formed.

Specifically, powders of the respective metal elements constituting the spinel type material are used as a starting material, and the powders are oxidized upon the sintering, whereby the bonding agent 300 having the spinel type material is formed. The reason why the paste is sufficiently densified even if the sintering temperature of the paste is relatively low is considered to be based upon the fact that the spinel type crystal (crystal of complex oxide) is combined and grown due to the local temperature rise on the surface of the powder by the heat generated from the oxidation reaction (=heat-generating reaction) of the powders of the respective metal elements. The outermost layer 142 and the interconnector 200 are bonded and electrically connected with this bonding agent 300. One example of the method of fabricating the bonding member of the air electrode in the SOFC cell illustrated in FIG. 1 and the interconnector has been described above.

Japanese Unexamined Patent Application No. 2009-16351 discloses that an air electrode made of manganese spinel compound is bonded to a metal interconnector with a bonding agent made of a manganese spinel compound (see especially paragraph 0029). However, this application not at all discloses the specific embodiment. A manganese compound is produced in such a manner that powders of manganese oxide and powders of cobalt oxide are mixed with a spinel ratio, and the resultant mixture is sintered. Specifically, the fabrication method of the bonding agent 300 according to the present embodiment is totally different from the fabrication method of a normal manganese spinel compound.

(Feature of Bonding Agent)

Figure 2:
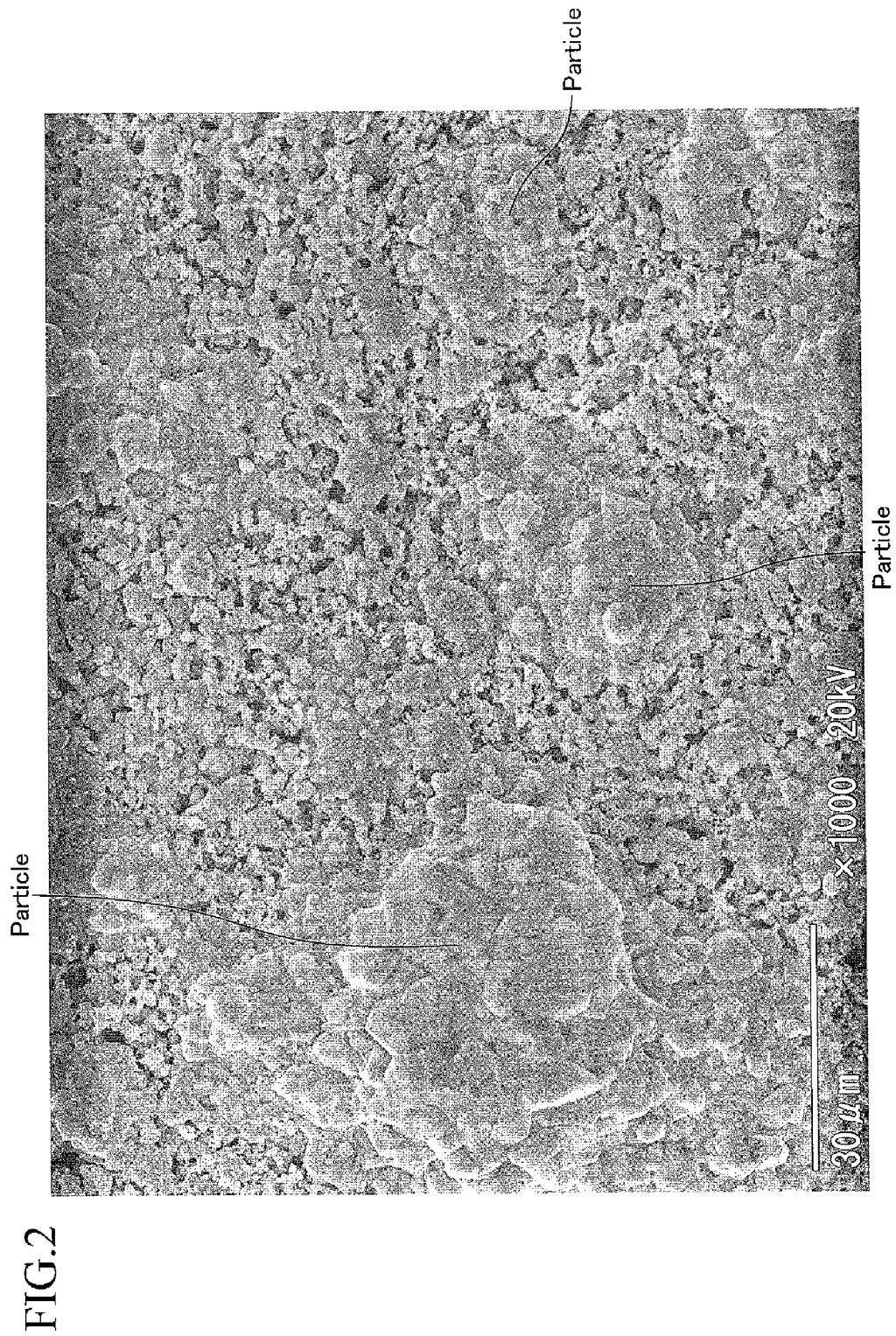
FIG. 2 is a diagram illustrating the bonding agent according to the present embodiment as observed at a magnification of 1000 with an electron scanning microscope.

Next, the feature of the bonding agent 300 according to the present embodiment, i.e., the feature of the bonding agent that is produced in such a manner that the powders of the respective metal elements (starting material) constituting the spinel type material ($MnCo_2O_4$) is oxidized during the sintering, will be described with reference to FIGS. 2 to 6. FIG. 2 is a view (SEM image) illustrating the surface of the bonding agent 300 that is observed at a magnification of 1000, FIGS. 3 and 5 are views illustrating the surface of the bonding agent 300 that is observed at a magnification of 5000, and FIGS. 4 and 6 are views illustrating the surface of the bonding agent 300 that is observed at a magnification of 10000.

Figure 3:
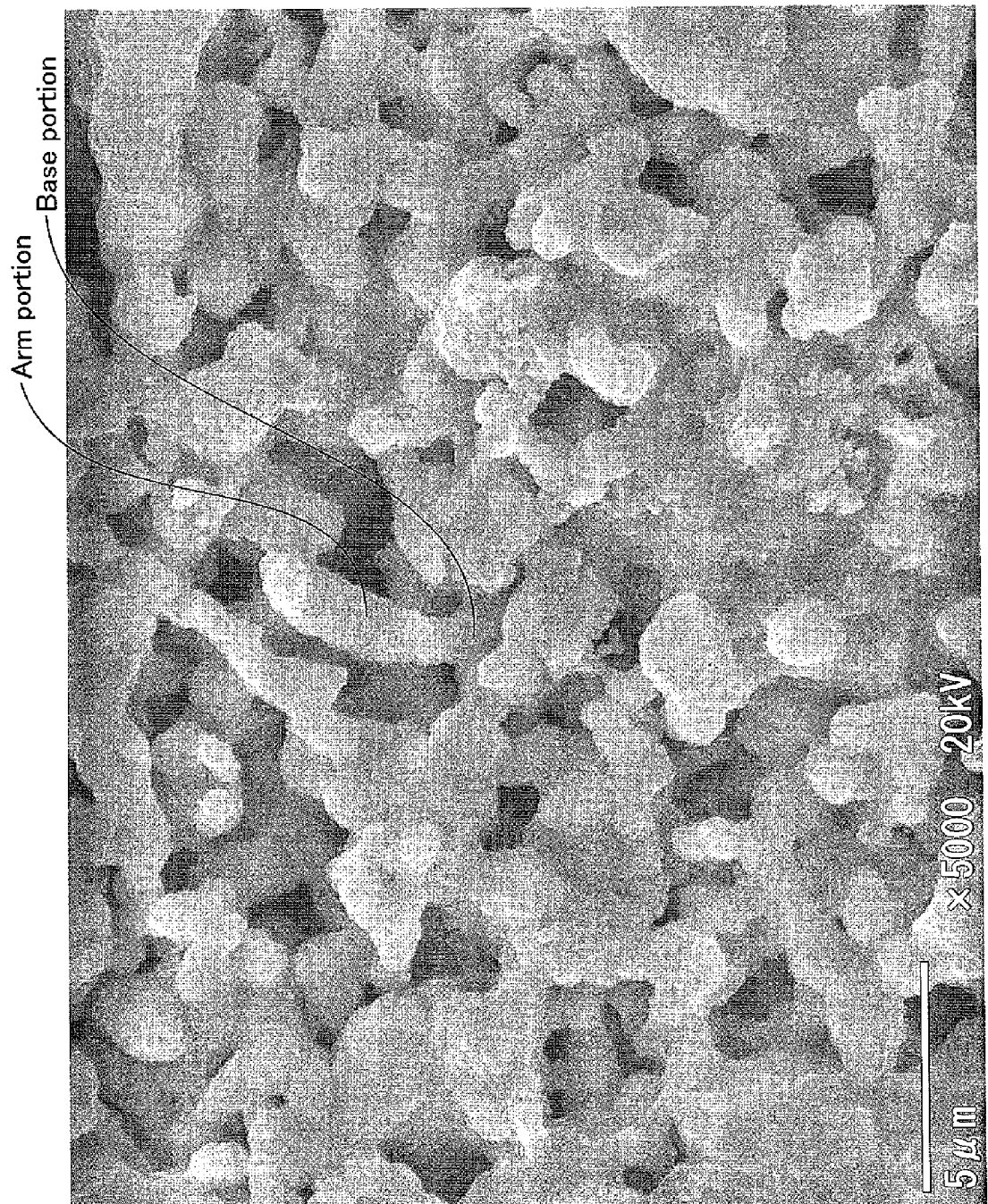
FIG. 3 is a diagram illustrating the bonding agent according to the present embodiment as observed at a magnification of 5000 with an electron scanning microscope.
Figure 4:
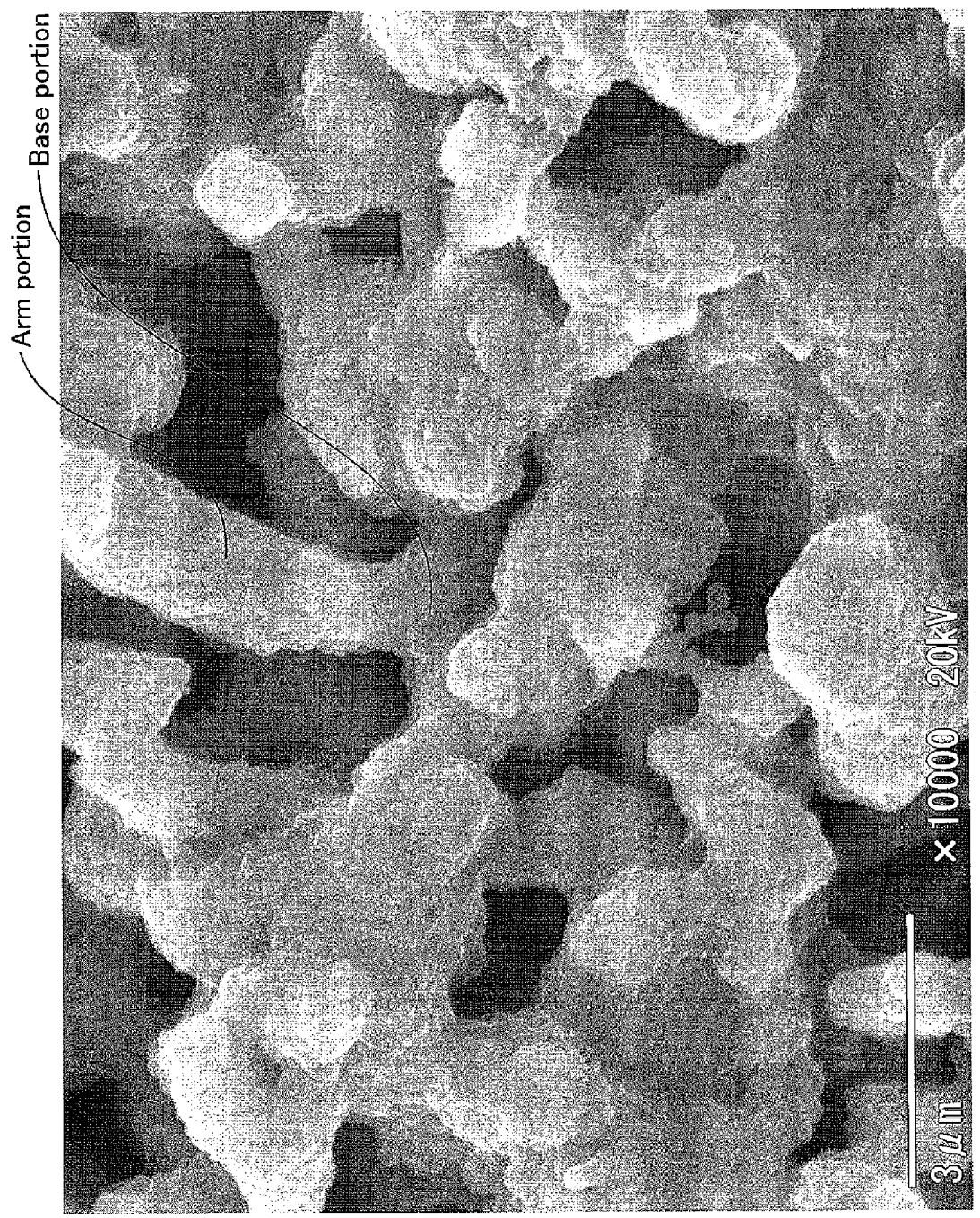
FIG. 4 is a diagram illustrating the bonding agent according to the present embodiment as observed at a magnification of 10000 with an electron scanning microscope.

As apparent from FIGS. 3 and 4, the bonding agent 300 has a "co-continuous structure". In the "co-continuous structure", a thickness of an "arm portion" that three-dimensionally (stereoscopically) links many "base portions" (the portions from which two or more arm portions extend) is 0.3 to 2.5 µm. The "thickness of the arm portion" is calculated as described below in the present embodiment. Specifically, 10 portions having the co-continuous structure are firstly extracted from the SEM image. Three data pieces each for the respective portions involved with the thickness of the arm portion measured from the extracted portions are collected. The "thickness of the arm portion" is calculated based upon the obtained 30 data pieces in total. It is considered that the formation of the "co-continuous structure" is related to the above-mentioned "growth action of the spinel type crystal due to the heat generated by the oxidation reaction during when the paste is sintered".

Figure 5:
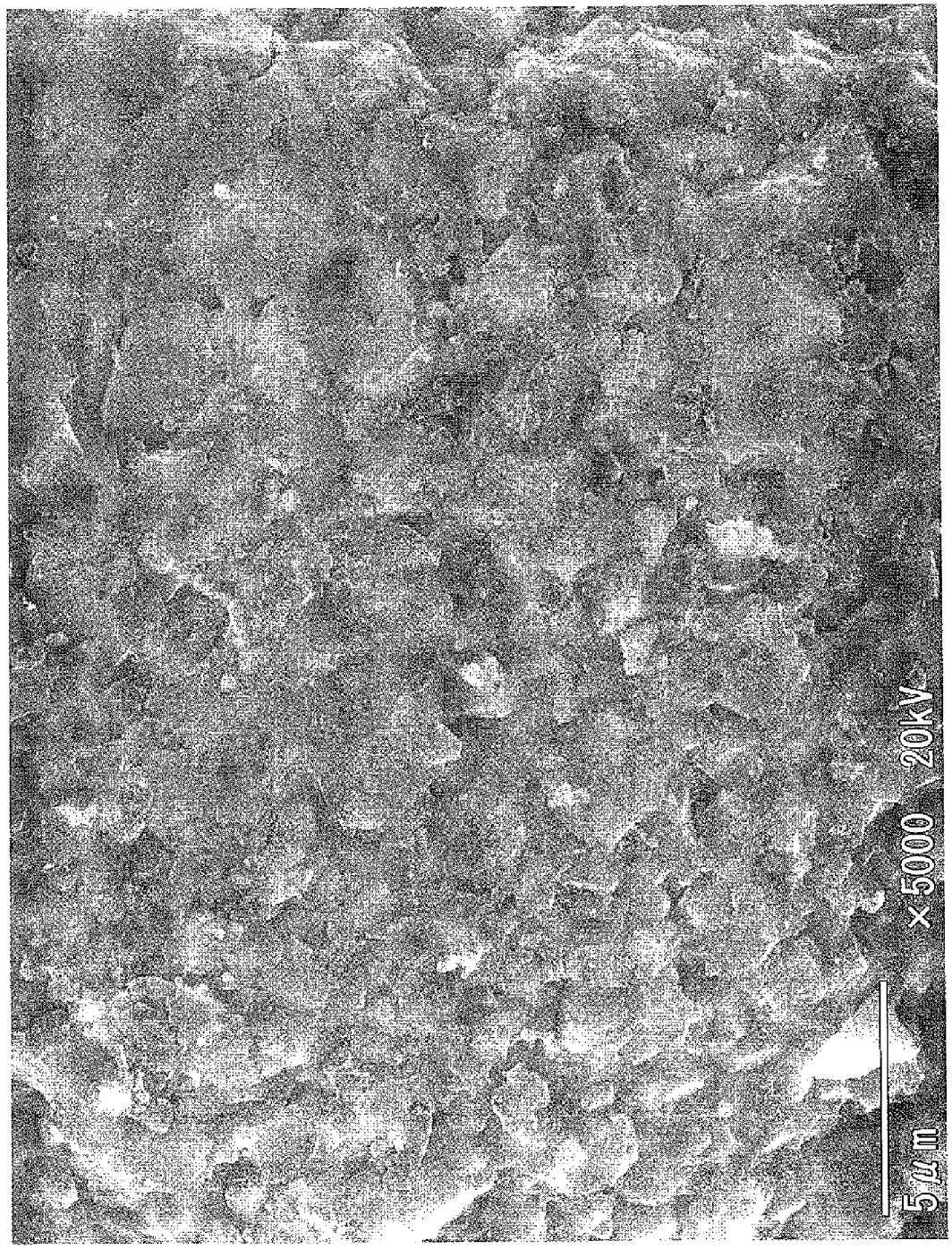
FIG. 5 is a diagram illustrating the bonding agent according to the present embodiment as observed at a magnification of 5000 with an electron scanning microscope.
Figure 6:
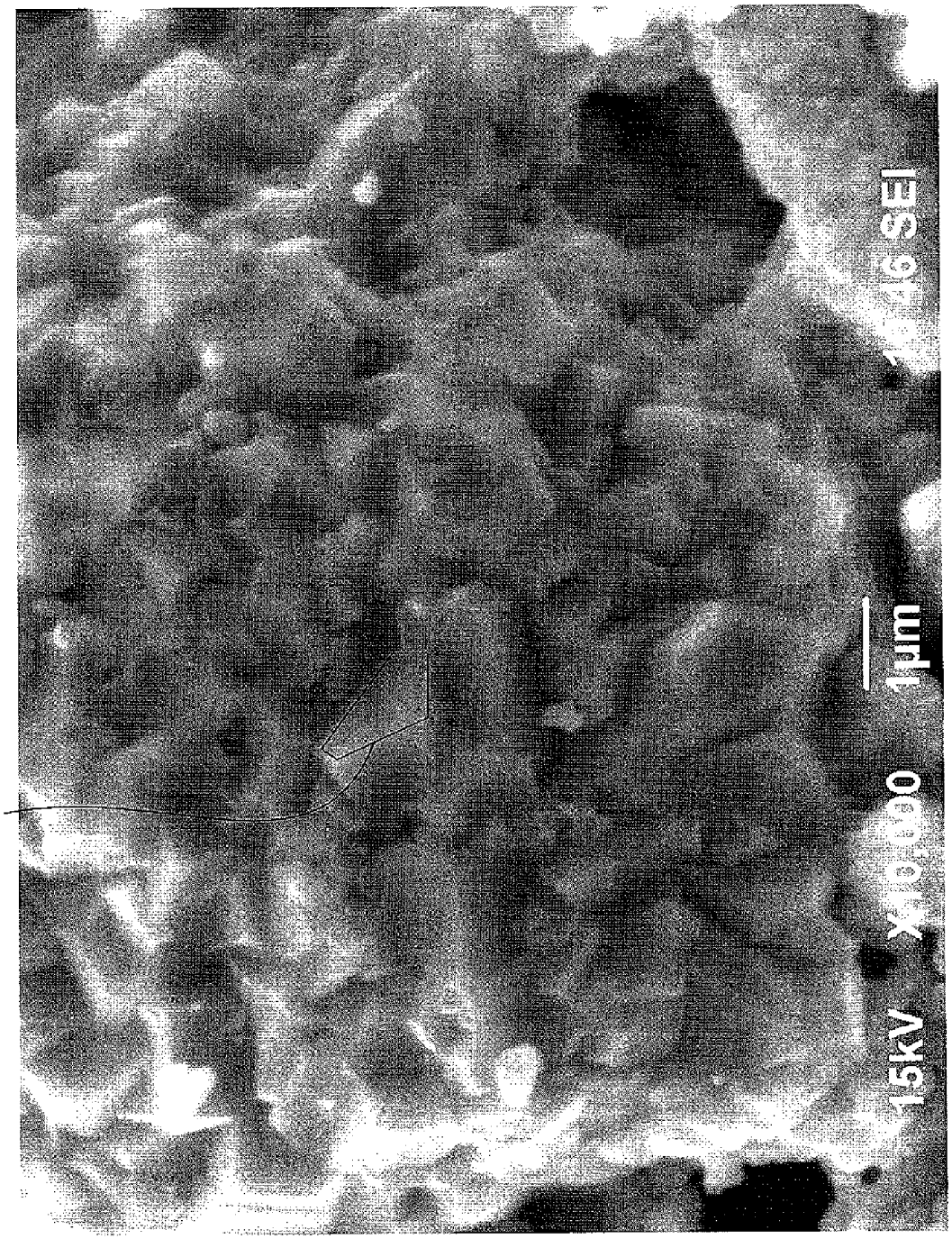
FIG. 6 is a diagram illustrating the bonding agent according to the present embodiment as observed at a magnification of 10000 with an electron scanning microscope.

As can be understood from FIGS. 2, 5, and 6, the bonding agent 300 includes spherical plural particles, each of which has plural crystal faces exposed to the surface. These particles are dispersed in the "co-continuous structure". The diameter of each of the plural particles is 5 to 80 µm. Here, as "the diameter of the particle", the longest one of the linear distances (the length corresponding to the diameter) passing through the center of the spherical particle in the particle is adopted. Further, the plural particles include at least one or more particles having a side of 1 µm or more of plural sides constituting the outline of the crystal surface (see FIG. 6). The formation of the "particle" is considered to be related to the above-mentioned "growth action of the spinel type crystal due to the heat generated by the oxidation reaction during when the paste is sintered".

As described above, in the above-mentioned embodiment, the bonding agent having the above-mentioned feature is synthesized by using a metal as a starting material, and by utilizing a reaction heat during the heat treatment. Instead of this, an organic metal may be used as the starting material. For example, di-i-propoxymanganese(II) (chemical formula: $Mn(O-i-C_3H_7)_2$) as an organic metal containing manganese, di-i-propoxycobalt(II) (chemical formula: $Co(O-i-C_3H_7)_2$) as an organic metal containing cobalt, and bis(dibivalloyl metanate) copper (chemical formula: $Cu(C_{11}H_{18}O_2)_2$) as an organic metal containing copper, can be used.

(Operation and Effect)

Next, an operation and effect of the bonding agent 300 according to the present embodiment will be described. In order to describe the operation and effect of the bonding agent 300, a bonding agent that is formed by using a powder of spinel type material, which is synthesized beforehand, as a starting material is prepared as a comparative example. The bonding agent according to the comparative example is formed as described below.

Firstly, the spinel type material ($MnCo_2O_4$) synthesized according to a predetermined process is pulverized by a pot mill, whereby powders of the spinel type material (complex oxide) are obtained. The diameter of the powder is 0.2 to 2 µm, and the average diameter is 0.5 µm. Ethyl cellulose serving as binder and terpineol serving as a solvent are added to this powder, according to need, to prepare a bonding paste. The outermost layer 142 and the interconnector 200 are bonded by using this paste, and this paste is dried for 1 hour at 100° C. Thereafter, the paste is sintered in air for 1 hour at a high temperature of 1000° C., whereby the bonding agent, which is a sintered body, according to the comparative example is formed.

In the comparative example, if the sintering temperature of the paste is lowered as in the embodiment, the paste is not sufficiently densified. This is based upon the fact that, because the oxide paste, which has already been oxidized, is used in the comparative example, the growth action of the spinel type crystal by the heat caused by the oxidation reaction during when the paste is sintered cannot be expected, different from the above-mentioned embodiment.

Figure 7:
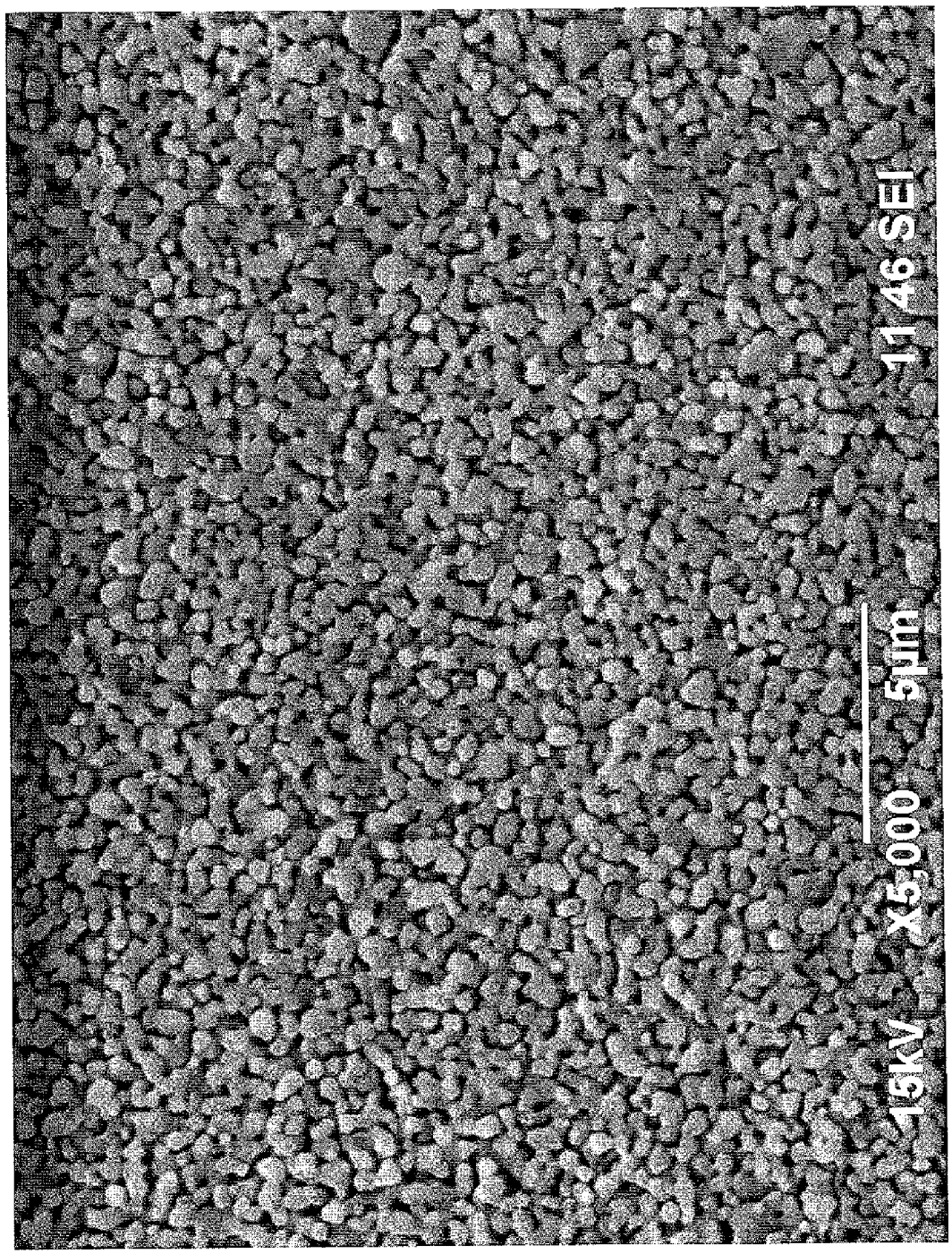
FIG. 7 is a diagram illustrating a bonding agent according to a comparative example as observed at a magnification of 5000 with an electron scanning microscope.
Figure 8:
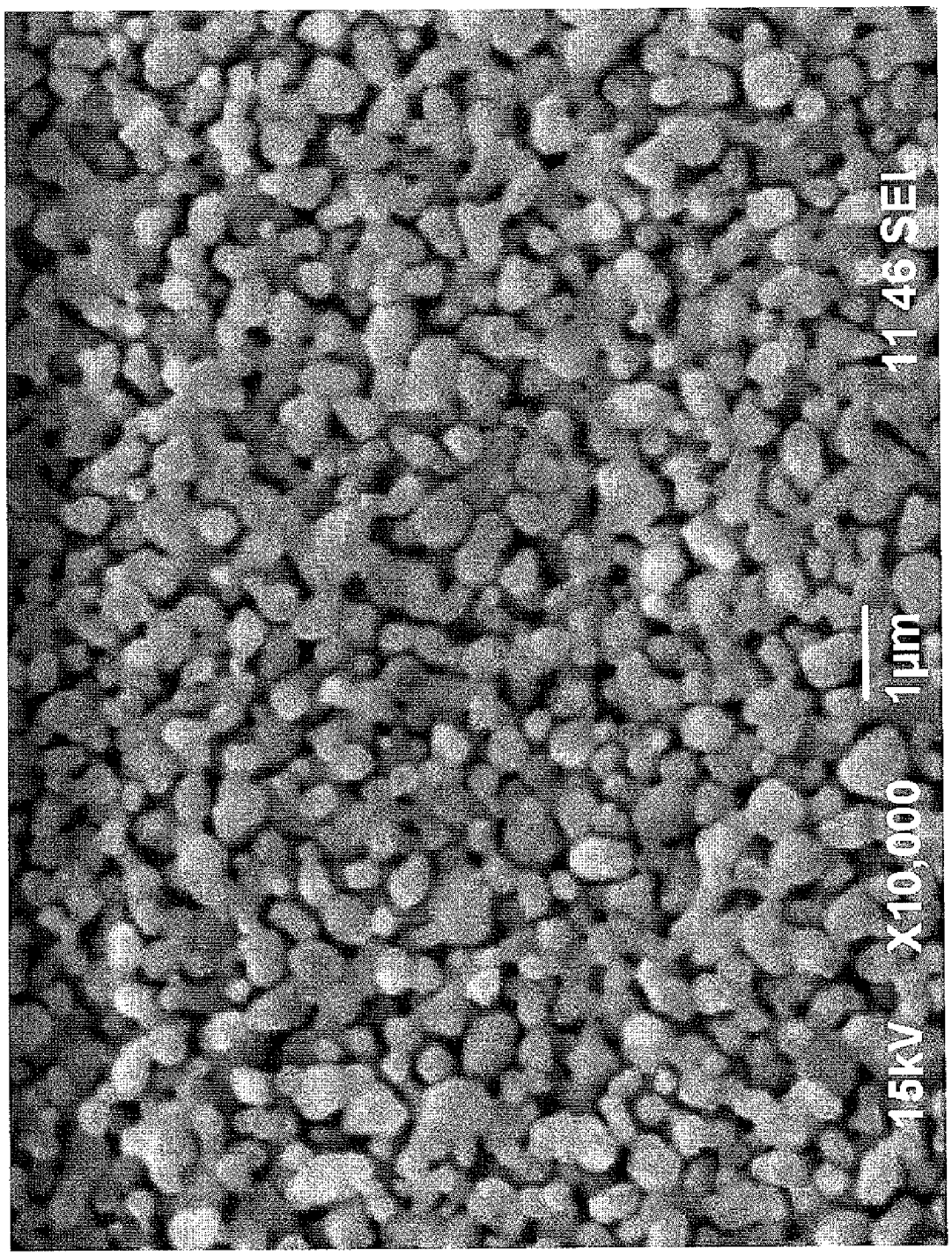
FIG. 8 is a diagram illustrating the bonding agent according to the comparative example as observed at a magnification of 10000 with an electron scanning microscope.

FIGS. 7 and 8 are views illustrating the surface of the bonding agent according to the comparative example that is observed at a magnification of 5000 and 10000 with an electron scanning microscope (SEM). As can be understood from FIGS. 7 and 8, the above-mentioned "particle" is not found in the bonding agent according to the comparative example, but instead of this, the structure in which the powders of the starting material are merely collected and sintered is found.

<Evaluation of Bonding Strength>

The present inventor has found that the bonding member according to the present embodiment has a bonding strength, between the outermost layer 142 and the bonding agent, greater than that of the bonding member according to the comparative example. A test A for confirming this finding will be described below.

(Test A)

In the test A, plural samples, each of which had a different combination of the material of the bonding agent, the average diameter of the powder that is the starting material of the bonding agent, and the sintering temperature (heat-treatment temperature) during the formation of the bonding agent, were prepared for the respective bonding member according to the present embodiment and the bonding member according to the comparative example. Specifically, 18 types of standards (combinations) were prepared as illustrated in Table 1. 5 samples were prepared for the respective standards. In Table 1, those (standards 1 to 8, 12 to 15) in which the starting material is the powders (metal powders) of the respective metal elements constituting the spinel type material correspond to the present embodiment, while those (standards 9 to 11, 16 to 18) in which the starting material is the powder (ceramic powder) of the spinel type material that is synthesized beforehand correspond to the comparative example.

TABLE 1

| Standard | Bonding agent | Starting material | Average diameter (μm) | Heat-treatment temperature (° C.) |
|---|---|---|---|---|
| 1 | $MnCo_2O_4$ | Metal powder | 2 | 800 |
| 2 | $MnCo_2O_4$ | Metal powder | 5 | 800 |
| 3 | $MnCo_2O_4$ | Metal powder | 12 | 800 |
| 4 | $MnCo_2O_4$ | Metal powder | 20 | 800 |
| 5 | $MnCo_2O_4$ | Metal powder | 2 | 850 |
| 6 | $MnCo_2O_4$ | Metal powder | 5 | 850 |
| 7 | $MnCo_2O_4$ | Metal powder | 12 | 850 |
| 8 | $MnCo_2O_4$ | Metal powder | 20 | 850 |
| 9 | $MnCo_2O_4$ | Ceramic powder | 0.5 | 1000 |
| 10 | $MnCo_2O_4$ | Ceramic powder | 0.8 | 1100 |
| 11 | $MnCo_2O_4$ | Ceramic powder | 1 | 1200 |
| 12 | $CuMn_2O_4$ | Metal powder | 2 | 800 |
| 13 | $CuMn_2O_4$ | Metal powder | 5 | 800 |
| 14 | $CuMn_2O_4$ | Metal powder | 2 | 850 |
| 15 | $CuMn_2O_4$ | Metal powder | 5 | 850 |
| 16 | $CuMn_2O_4$ | Ceramic powder | 0.5 | 1000 |
| 17 | $CuMn_2O_4$ | Ceramic powder | 0.8 | 1100 |
| 18 | $CuMn_2O_4$ | Ceramic powder | 1 | 1200 |

Figure 9:
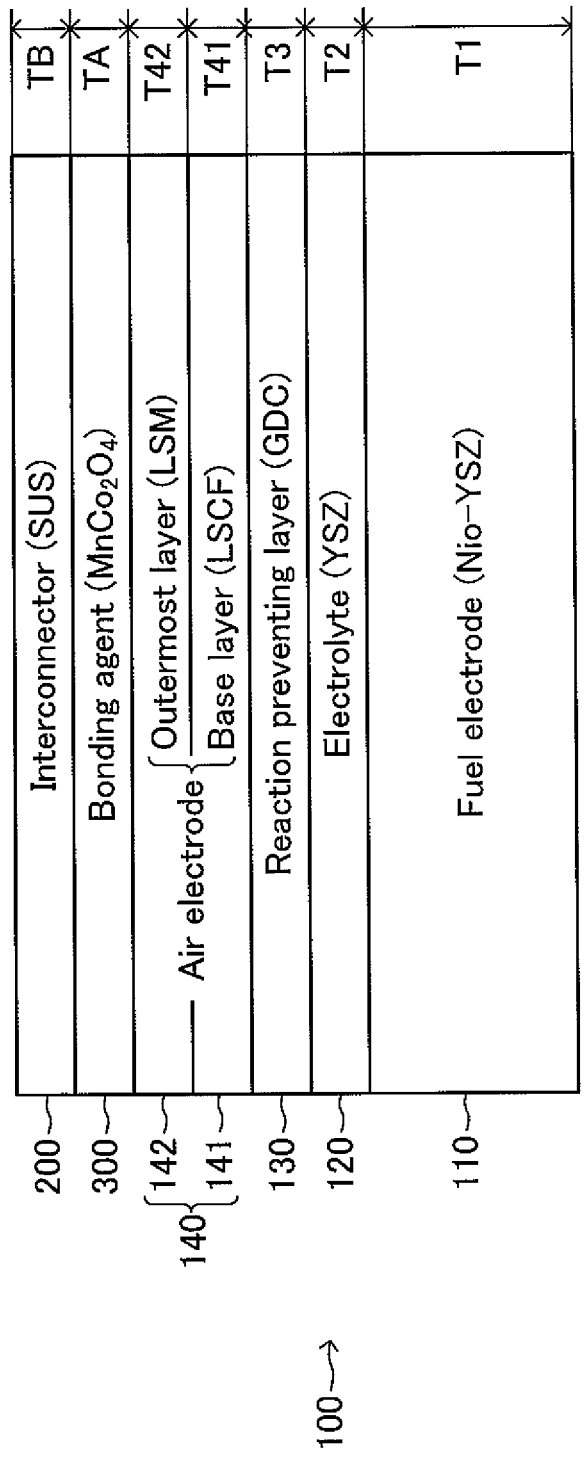
FIG. 9 is a schematic diagram illustrating the configuration of a sample for an evaluation of bonding strength.

As illustrated in FIG. 9, the shape of the interconnector 200 and the shape of the bonding agent as viewed from the top in these samples are the same plate-like shape. Specifically, the air electrode 140 (specifically, the outermost layer 142) and the interconnector 200, which have the same shape as viewed from the top, are bonded by the bonding agent all over the bonding surface.

In these samples, the thickness T1 of the fuel electrode 110 is 500 μm, the thickness T2 of the electrolyte 120 (3YSZ) is 5 μm, the thickness T3 of the reaction preventing layer 130 (GDC) is 5 μm, the thickness T41 of the base layer 141 (LSCF) of the air electrode 140 is 30 μm, the thickness T42 of the outermost layer 142 (LSM) is 20 μm, the thickness TA of the bonding agent 300 is 200 μm, and the thickness TB of the interconnector 200 is 450 μm, those of which are constant. The shape of each of the samples viewed from the top is a circle having a diameter of 30 cm.

Figure 10:
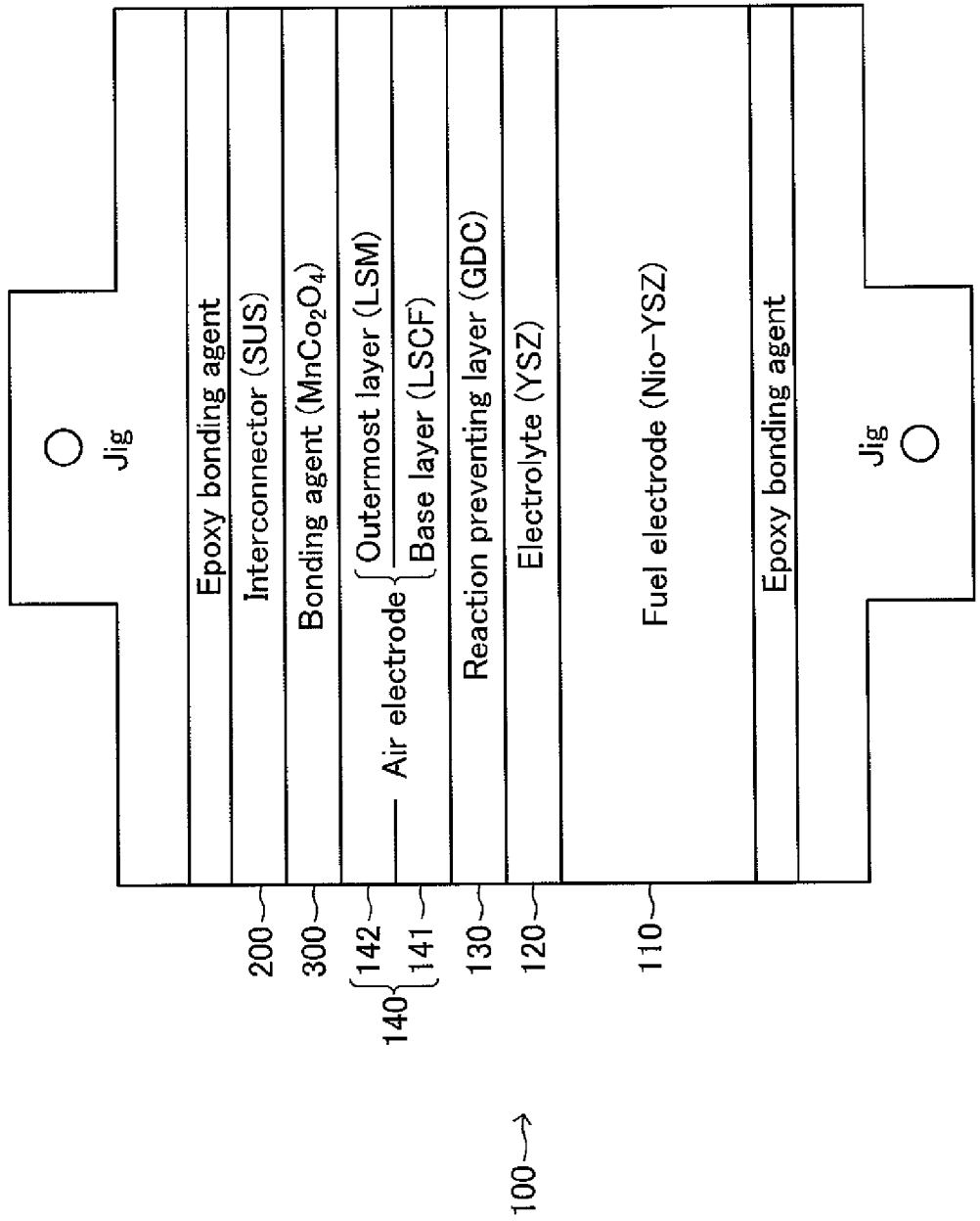
FIG. 10 is a schematic diagram illustrating a configuration when the sample illustrated in FIG. 9 is subject to a tensile test.

As illustrated in FIG. 10, a jig for a tensile test was adhered on the upper and lower surfaces of each sample respectively with epoxy resin. A thermosetting epoxy bonding agent (trade name: TB2222P) by Three Bond Co., Ltd., having a great bonding force, was used as the epoxy resin. The epoxy resin having the great bonding force was used in order to obtain a bonding strength greater than the bonding strength at the bonding portion by the bonding agent 300. The condition (bonding condition) for curing the epoxy resin was 100° C. for 60 minutes.

When force for separating the upper and lower jigs in the vertical direction was applied, tensile force in the vertical direction was applied to each sample. The magnitude of the tensile force (hereinafter referred to as "tensile strength") when the bonding portion by the bonding agent was destroyed was measured. The bonded portion (the weakest portion) destroyed in the samples according to the present embodiment (standards 1 to 8, 12 to 15) was the bonded portion (interface) between the outermost layer 142 and the bonding agent, while the bonded portion destroyed in the samples according to the comparative example (standards 9 to 11, 16 to 18) is the inside of the bonding agent. Table 2 shows the result.

TABLE 2

| Standard | Tensile strength (MPa) | Destroyed portion |
|---|---|---|
| 1 | 49 | Interface of bonding agent/outermost layer |
| 2 | 50 | Interface of bonding agent/outermost layer |
| 3 | 45 | Interface of bonding agent/outermost layer |
| 4 | 42 | Interface of bonding agent/outermost layer |
| 5 | 55 | Interface of bonding agent/outermost layer |
| 6 | 51 | Interface of bonding agent/outermost layer |
| 7 | 48 | Interface of bonding agent/outermost layer |
| 8 | 47 | Interface of bonding agent/outermost layer |
| 9 | 13 | Inside of bonding agent |
| 10 | 16 | Inside of bonding agent |
| 11 | 17 | Inside of bonding agent |
| 12 | 48 | Interface of bonding agent/outermost layer |
| 13 | 46 | Interface of bonding agent/outermost layer |
| 14 | 53 | Interface of bonding agent/outermost layer |
| 15 | 51 | Interface of bonding agent/outermost layer |
| 16 | 16 | Inside of bonding agent |
| 17 | 18 | Inside of bonding agent |
| 18 | 20 | Inside of bonding agent |

As can be understood from Table 2, the bonding agent 300 according to the present embodiment tends to have the tensile strength greater than that of the bonding agent according to the comparative example. Specifically, it can be said that the bonding agent 300 according to the present embodiment has a bonding strength between the outermost layer 142 and the bonding agent greater than the bonding strength of the bonding agent according to the comparative example.

<Evaluation of Electric Resistance>

The present inventor has found that the bonding member according to the present embodiment has an electric resistance greater than that of the bonding member according to the comparative example (has conductivity higher than that of the bonding member according to the comparative example). A test B for confirming this finding will be described below.

(Test B)

In Test B, plural samples, each of which has the combination similar to the Test A and corresponds to FIG. 1, were prepared for the respective bonding member according to the present embodiment and the bonding member according to the comparative example. Specifically, as well as the Test A, 18 types of standards (combinations) illustrated in Table 1 were prepared. 3 samples were produced for each standard. As well as the Test A, those (standards 1 to 8, 12 to 15) in which the starting material is the powders (metal powders) of the respective metal elements constituting the spinel type material correspond to the present embodiment, while those (standards 9 to 11, 16 to 18) in which the starting material is the powder (ceramic powder) of the spinel type material that is synthesized beforehand correspond to the comparative example. In these samples, the shape and size except for the interconnector and the bonding agent were the same as those in the samples in Test A.

In the Test B, an interconnector (made of Ni) at the fuel electrode side was bonded to the surface of the fuel electrode 110 in each sample. The interconnector was bonded by sintering a bonding paste made of Ni.

The temperature of each sample was raised up to 800° C., while supplying nitrogen gas to the fuel electrode 110 and supplying air to the air electrode 140. When the temperature reached 800° C., a reduction process was performed for 3 hours, while supplying hydrogen gas to the air electrode 110. After the reduction process, an output (output density) taken out to the outside through the interconnector 200 at the side of the air electrode 140 and the interconnector at the side of the fuel electrode 110 was measured. The value at the temperature of 800° C. and rated voltage of 0.8 V was used as the output density. The greater output density means the reduced electric resistance. Table 3 illustrates the result.

TABLE 3

| Standard | Output density (mW/cm$^2$) | Evaluation result |
| --- | --- | --- |
| 1 | 760 | Satisfactory |
| 2 | 720 | Satisfactory |
| 3 | 680 | Satisfactory |
| 4 | 710 | Satisfactory |
| 5 | 650 | Satisfactory |
| 6 | 680 | Satisfactory |
| 7 | 715 | Satisfactory |
| 8 | 695 | Satisfactory |
| 9 | 320 | Output density was reduced due to increase in ohmic resistance |
| 10 | 310 | Output density was reduced due to increase in ohmic resistance |
| 11 | 295 | Output density was reduced due to increase in ohmic resistance |
| 12 | 670 | Satisfactory |
| 13 | 690 | Satisfactory |
| 14 | 730 | Satisfactory |
| 15 | 720 | Satisfactory |
| 16 | 325 | Output density was reduced due to increase in ohmic resistance |
| 17 | 300 | Output density was reduced due to increase in ohmic resistance |
| 18 | 310 | Output density was reduced due to increase in ohmic resistance |

As is understood from Table 3, the bonding member according to the present embodiment tends to have the output density greater than that of the bonding member according to the comparative example. Specifically, it can be said that the bonding agent 300 according to the present embodiment has an electric resistance smaller than that of the bonding agent according to the comparative example.

As described above, the bonding agent according to the present embodiment, which is formed by using powders of the respective metal elements (Mn,Co) constituting the spinel type material as a starting material, has greater conductivity (smaller electric resistance) and greater bonding strength compared to the bonding agent according to the comparative example, which is formed by using powders of spinel type material (MnCo$_2$O$_4$) synthesized beforehand as the starting material. Specifically, according to the bonding agent 300 of the present embodiment, the paste is sufficiently densified even if the sintering temperature is set to be relatively low (e.g., 700 to 900° C.), whereby the bonding agent having sufficiently small electric resistance, and sufficiently great bonding strength can be obtained.

It has been described above that, in the present embodiment in which the bonding agent is formed by using the powders of the respective metal elements (Mn,Co) constituting the spinel type material as a starting material in case where the air electrode 140 (corresponding to the above-mentioned "first conductive connection member") and the interconnector 200 (corresponding to the above-mentioned "second conductive connection member") are bonded by the bonding agent containing "the transition metal oxide (MnCo$_2$O$_4$,CuMn$_2$O$_4$, etc.) having the spinel type crystal structure", the bonding agent has greater conductivity (smaller electric resistance) and greater bonding strength compared to the bonding agent according to the comparative example, which is formed by using powders of spinel type material (MnCo$_2$O$_4$) synthesized beforehand as the starting material.

Figure 11:
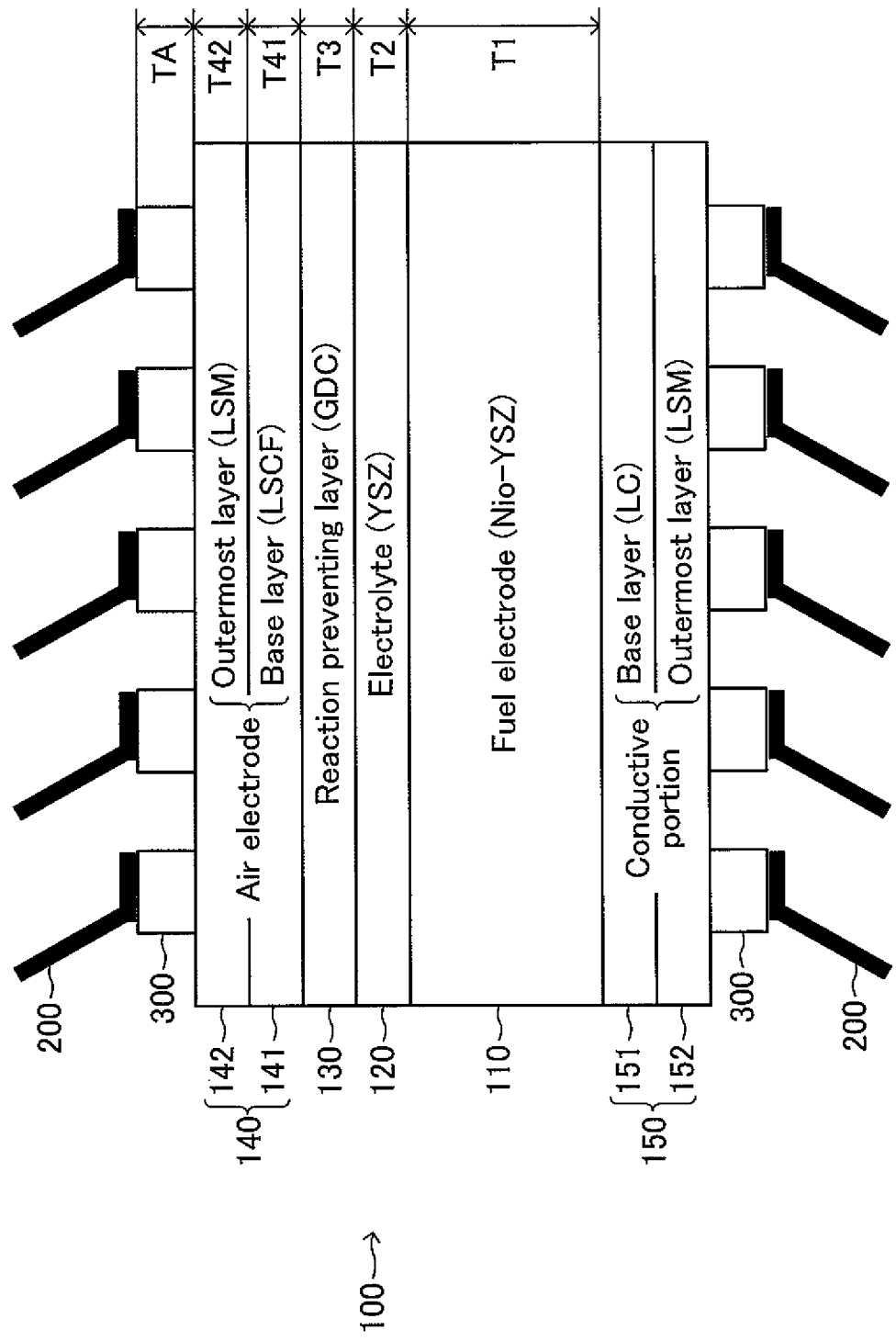
FIG. 11 is a schematic diagram illustrating a state in which a conductive portion that is fixed to the fuel electrode and contains LC and an interconnector are bonded by a bonding agent.

Similarly, it has been found that, as illustrated in FIG. 11, in case where the conductive portion 150 (corresponding to the above-mentioned "first conductive connection member"), which is fixed to the fuel electrode 110 and contains lanthanum chromite (LC) electrically connected to the fuel electrode 110, and the interconnector 200 corresponding to the above-mentioned "second conductive connection member") are bonded by the bonding agent containing "the transition metal oxide (MnCo$_2$O$_4$,CuMn$_2$O$_4$, etc.) having the spinel type crystal structure", the bonding agent has greater conductivity (smaller electric resistance) and greater bonding strength, compared to the bonding agent according to the comparative example, which is formed by using powders of spinel type material (MnCo$_2$O$_4$) synthesized beforehand as the starting material, if the bonding agent is formed by using the powders of the respective metal elements (Mn, Co) constituting the spinel type material as a starting material.

The chemical formula of lanthanum chromite LC is expressed by the following formula (3). In the formula (3), A is at least one type of element selected from Ca, Sr, and Ba. B is at least one type of element selected from Co, Ni, V, Mg, and Al. The range of x is 0 to 0.4, and more preferably 0.05 to 0.2. The range of y is 0 to 0.3, and more preferably 0.02 to 0.22. The range of z is 0 to 0.1, and more preferably 0.02 to 0.05. δ is a minute value containing 0.

$$La_{1-x}Cr_{1-y+z}B_yO_{3-\delta} \quad (3)$$

In FIG. 11, the conductive portion 150 has two layers that are a base layer 151 made of LC and an outermost layer 152 made of LSM. The reason why the outermost (LSM layer) is formed is based upon the fact that the bonding strength between the conductive portion 150 and the bonding agent 300 increases more than the case in which the outermost (LSM layer) is not formed.

Figure 12:
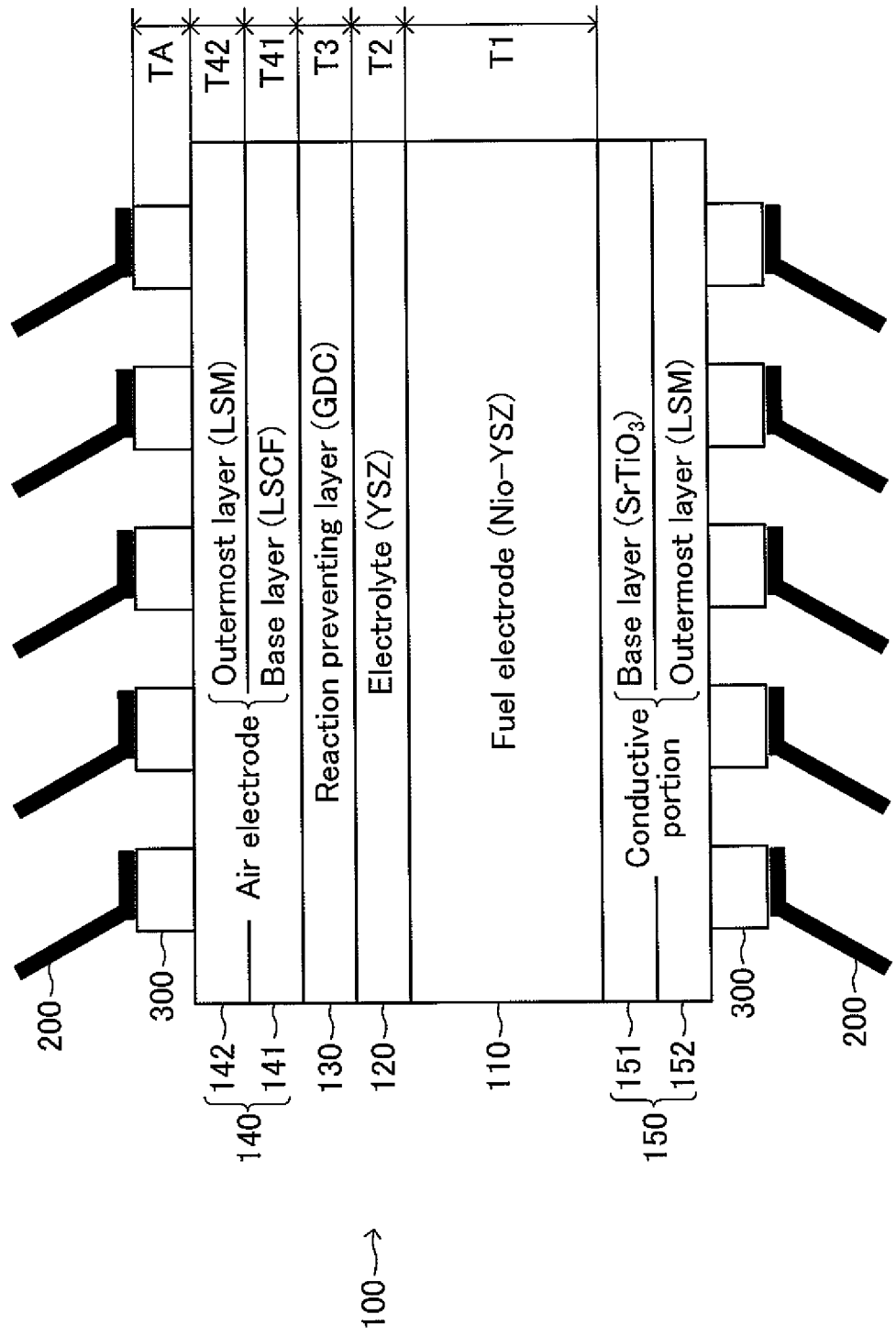
FIG. 12 is a schematic diagram illustrating a state in which a conductive portion that is fixed to the fuel electrode and contains $SrTiO_3$ and an interconnector are bonded by a bonding agent.

As illustrated in FIG. 12, a base layer 151 made of titanium oxide may be used instead of the base layer 151 made of LC in the conductive portion 150.

The chemical formula of the titanium oxide is represented by the following formula (4). In the formula (4), A is at least one type of element selected from alkaline-earth elements. B is at least one type of element selected from Sc, Y, and lanthanoid element. D is at least one type of element selected from fourth-period, fifth-period, and sixth-period transition metals, Al, Si, Zn, Ga, Ge, Sn, Sb, Pb, and Bi. The range of x is 0 to 0.5, the range of y is 0 to 0.5, and the range of z is −0.05 to 0.05. δ is a minute value containing 0. "Strontium titanate SrTiO$_3$" using strontium Sr can be employed as A, for example.

$$(A_{1-x}B_x)_{1-z}(Ti_{1-y}D_y)O_{3-\delta} \quad (4)$$

As illustrated in FIGS. 11 and 12, why LC or titanium oxide (especially, strontium titanate SrTiO$_3$) is used as the terminal electrode at the fuel electrode is based upon the fact that one end (inner side) of the terminal electrode is exposed to the reduction atmosphere and the other end (outer side) is exposed to the oxidation atmosphere. In the present circumstances, Lc and SrTiO$_3$ are most excellent as the conductive ceramic stable in both the reduction atmosphere and the oxidation atmosphere.

From the above, it can be said that, when the bonding agent is formed by using the powders of the respective metal elements (Mn,Co) constituting the spinel type material as a starting material in case where the first conductive connection member and the second conductive connection member are bonded by the bonding agent containing "the transition metal oxide (MnCo$_2$O$_4$,CuMn$_2$O$_4$, etc.) having the spinel type crystal structure", the bonding agent has greater conductivity (smaller electric resistance) and greater bonding strength compared to the bonding agent, which is formed by using powders of spinel type material ($MnCo_2O_4$) synthesized beforehand as the starting material.

What is claimed is:

1. A bonding agent that bonds a first conductive connection member and a second conductive connection member, which is different from the first conductive connection member, to each other, and that electrically connects the first and second conductive connection members to each other, wherein the bonding agent is formed from sintering metal powders and is configured to include a transition metal oxide having a spinel type crystal structure, has a co-continuous structure, and includes a spherical particle in which plural crystal faces are exposed to the surface, the particle having a side with a length of 1 μm or more, among the plural sides constituting the outline of the crystal face.

2. A bonding agent according to claim 1, wherein a thickness of an arm portion, which links many base portions to one another, in the co-continuous structure is 0.3 to 2.5 μm.

3. A bonding agent according to claim 1, wherein the diameter of the particle is 5 to 80 μm.

4. A bonding agent according to claim 1, wherein the transition metal oxide contains at least one of $MnCo_2O_4$ and $CuMn_2O_4$.

5. A bonding agent according to claim 1, wherein a paste containing a mixture of powders of respective metal elements constituting the transition metal oxide is interposed between the first and second conductive connection members, and the resultant is sintered.

6. A bonding agent according to claim 1, further containing a noble metal in addition to the transition metal oxide.

7. A bonding agent according to claim 1, wherein the first conductive connection member is an air electrode in a cell of a solid oxide fuel cell that includes a solid electrolyte, a fuel electrode, which is arranged integral with the solid electrolyte and allows a fuel gas to react through the contact with the fuel gas, and an air electrode, which is arranged integral with the solid electrolyte and allows a gas containing oxygen to react through the contact with the gas containing oxygen.

8. A bonding agent according to claim 1, wherein the first conductive connection member is a conductive portion in a cell of a solid oxide fuel cell that includes a solid electrolyte, a fuel electrode, which is arranged integral with the solid electrolyte and allows a fuel gas to react through the contact with the fuel gas, and an air electrode, which is arranged integral with the solid electrolyte and allows a gas containing oxygen to react through the contact with the gas containing oxygen, wherein the conductive portion is fixed to the fuel electrode, is electrically connected to the fuel electrode, and contains lanthanum chromite represented by a chemical formula $La_{1-x}A_xCr_{1-y+z}B_yO_3$ (A: at least one type of element selected from Ca, Sr, and Ba, B: at least one type of element selected from Co, Ni, and Al, range of x: 0.05 to 0.2, range of y: 0.02 to 0.22, range of z: 0.02 to 0.05).

9. A bonding agent according to claim 1, wherein the first conductive connection member is a conductive portion in a cell of a solid oxide fuel cell that includes a solid electrolyte, a fuel electrode, which is arranged integral with the solid electrolyte and allows a fuel gas to react through the contact with the fuel gas, and an air electrode, which is arranged integral with the solid electrolyte and allows a gas containing oxygen to react through the contact with the gas containing oxygen, wherein the conductive portion is fixed to the fuel electrode, is electrically connected to the fuel electrode, and contains a titanium oxide represented by a chemical formula $(A_{1-x},B_x)_{1-z}(Ti_{1-y},D_y)O_3$ (A: at least one type of element selected from alkaline-earth element, B: at least one type of element selected from Sc, Y, and lanthanoid element, D: at least one type of element selected from fourth-period, fifth-period, and sixth-period transition metals, Al, Si, Zn, Ga, Ge, Sn, Sb, Pb, and Bi, range of x: 0 to 0.5, range of y: 0 to 0.5, range of z: −0.05 to 0.05).

10. A bonding agent according to claim 1, wherein a diameter of the metal powders is 0.5 μm to 5 μm and an average diameter of the metal powders is 2 μm.

* * * * *